(12) United States Patent
Li et al.

(10) Patent No.: US 12,405,387 B2
(45) Date of Patent: Sep. 2, 2025

(54) AIRBORNE BeiDou SYSTEM AND METHOD FOR APPLICATION THEREOF

(71) Applicant: CHINA ELECTRONICS TECHNOLOGY AVIONICS CO., LTD., Sichuan (CN)

(72) Inventors: Weiwei Li, Sichuan (CN); Yongfeng Xie, Sichuan (CN); Junkang Ma, Sichuan (CN); Fei Wu, Sichuan (CN)

(73) Assignee: CHINA ELECTRONICS TECHNOLOGY AVIONICS CO., LTD., Sichuan (CN)

( * ) Notice: Subject to any disclaimer, the term of this patent is extended or adjusted under 35 U.S.C. 154(b) by 456 days.

(21) Appl. No.: 17/787,438

(22) PCT Filed: Dec. 16, 2020

(86) PCT No.: PCT/CN2020/136682
§ 371 (c)(1),
(2) Date: Jun. 20, 2022

(87) PCT Pub. No.: WO2021/129473
PCT Pub. Date: Jul. 1, 2021

(65) Prior Publication Data
US 2023/0014225 A1    Jan. 19, 2023

(30) Foreign Application Priority Data
Dec. 25, 2019    (CN) .......................... 201911356512.0

(51) Int. Cl.
*G01S 19/37*    (2010.01)
(52) U.S. Cl.
CPC ..................................... *G01S 19/37* (2013.01)
(58) Field of Classification Search
None
See application file for complete search history.

(56) References Cited

U.S. PATENT DOCUMENTS

2018/0284302 A1    10/2018    Zhang et al.

FOREIGN PATENT DOCUMENTS

| CN | 204595221 U | 8/2015 |
| CN | 105070105 A | 11/2015 |

(Continued)

OTHER PUBLICATIONS

CN107566424 machine translation (Year: 2018).*

(Continued)

*Primary Examiner* — Whitney Moore
(74) *Attorney, Agent, or Firm* — Yue (Robert) Xu; Apex Attorneys at Law, LLP

(57) ABSTRACT

The present invention provides an airborne BeiDou system and method for application thereof, the airborne BeiDou system comprising: an airborne communication navigation monitoring system which integrates a BeiDou application software module of a BeiDou navigation communication subsystem and a BeiDou protocol stack software module; a BeiDou transceiver connected to said airborne communication navigation monitoring system; a BeiDou server connected to said BeiDou transceiver. The present invention can integrate a BeiDou application software module of a BeiDou navigation communication subsystem and a BeiDou protocol stack software module into an airborne communication navigation monitoring system such that the airborne communication navigation monitoring system can, by means of the BeiDou application software module and the BeiDou protocol stack software module, perform data interaction with the BeiDou transceiver and the BeiDou server, thus achieving autonomous airborne communication navigation monitoring in the field of aviation.

6 Claims, 5 Drawing Sheets

(56) References Cited

FOREIGN PATENT DOCUMENTS

| | | | |
|---|---|---|---|
| CN | 105607081 | A | 5/2016 |
| CN | 106371113 | A | 2/2017 |
| CN | 106530103 | A | 3/2017 |
| CN | 107093303 | A | 8/2017 |
| CN | 107566424 | A | 1/2018 |
| CN | 107808551 | A | 3/2018 |
| CN | 107991689 | A | 5/2018 |
| CN | 108279009 | A | 7/2018 |
| CN | 109270942 | A | 1/2019 |
| CN | 111181624 | A | 5/2020 |

OTHER PUBLICATIONS

CN107808551 machine translation (Year: 2018).*
Search Report dated Dec. 1, 2023 for European patent application No. 20907162.0.
International Search Report for PCT/CN2020/136682 mailed Mar. 16, 2021, ISA/CN.

* cited by examiner

AIRBORNE BeiDou SYSTEM AND METHOD FOR APPLICATION THEREOF

This application is the national phase of International Patent Application No. PCT/CN2020/136682, titled "AIRBORNE BEIDOU SYSTEM AND METHOD FOR APPLICATION THEREOF", filed on Dec. 16, 2020, which claims priority to Chinese Patent Application No. 201911356512.0, titled "AIRBORNE BEIDOU SYSTEM AND APPLICATION METHOD THEREOF", filed on Dec. 25, 2019 with China National Intellectual Property Administration (CNIPA), both of which are incorporated herein by reference in their entireties.

FIELD

The present disclosure relates to the field of communication technology, and in particular to an airborne BeiDou system and an application method of the airborne BeiDou system.

BACKGROUND

With the technical development of the BeiDou system, the BeiDou navigation communication subsystem in the BeiDou system is gradually improved and applied widely. The BeiDou navigation communication subsystem is mainly used for realizing a navigation function and a short message communication function of the BeiDou system.

At present, most airborne communication navigation monitoring systems in the aviation field utilize foreign navigation systems, which are not applicable to the BeiDou navigation communication subsystem.

SUMMARY

In view of the above, an airborne BeiDou system and an application method of the airborne BeiDou system are provided according to the present disclosure to integrate a BeiDou navigation communication subsystem into an airborne communication navigation monitoring system, realizing autonomous airborne communication navigation monitoring in the aviation field.

In order to achieve the above objectives, the following technical features are provided according to the present disclosure.

An airborne BeiDou system includes an airborne communication navigation monitoring system, a BeiDou transceiver, and a BeiDou server. The airborne communication navigation monitoring system is integrated with a BeiDou application software module and a BeiDou protocol stack software module of a BeiDou navigation communication subsystem. The BeiDou transceiver is connected with the airborne communication navigation monitoring system. The BeiDou server is connected with the BeiDou transceiver.

In an embodiment, the airborne communication navigation monitoring system includes a display and control device and an airborne navigation device. A terminal of the airborne navigation device is connected with the display and control device and the other terminal of the airborne navigation device is connected with the BeiDou transceiver.

The airborne navigation device is integrated with an Integrated Modular Avionics. The Integrated Modular Avionics includes a data link application software module and a data link communication management module. The data link application software module interacts with the display and control device. A terminal of the data link communication management module is connected with the data link application software module, and the other terminal of the data link communication management module is connected with the BeiDou transceiver.

The BeiDou application software module is integrated into the data link application software module, and the BeiDou protocol stack software module is integrated into the data link communication management module.

In an embodiment, an interface protocol between the display and control device and the data link application software module is used between the BeiDou application software module and the display and control device, and an interface protocol between the data link application software module and the data link communication management module is used between the BeiDou application software module and the BeiDou protocol stack software module.

In an embodiment, the interface protocol between the display and control device and the data link application software module comprises an Arinc661 interface protocol, and the interface protocol between the data link application software module and the data link communication management module comprises an Arinc619 interface protocol.

A transmitting method of an airborne BeiDou system is applied to the airborne BeiDou system described above. The transmitting method includes:
  receiving, by the airborne communication navigation monitoring system, a user operation instruction, processing, by the airborne communication navigation monitoring system, the user operation instruction based on the integrated BeiDou application software module and BeiDou protocol stack software module to generate a downlink BeiDou short message, and transmitting, by the airborne communication navigation monitoring system, the downlink BeiDou short message;
  receiving, by the BeiDou transceiver, the downlink BeiDou short message, and forwarding, by the BeiDou transceiver, the downlink BeiDou short message to the BeiDou server; and
  receiving and processing, by the BeiDou server, the downlink BeiDou short message.

In an embodiment, the airborne communication navigation monitoring system includes a display and control device and an airborne navigation device. A terminal of the airborne navigation device is connected with the display and control device and the other terminal of the airborne navigation device is connected with the BeiDou transceiver.

The airborne navigation device is integrated with an Integrated Modular Avionics. The Integrated Modular Avionics includes a data link application software module and a data link communication management module. The data link application software module interacts with the display and control device. A terminal of the data link communication management module is connected with the data link application software module, and the other terminal of the data link communication management module is connected with the BeiDou transceiver. The BeiDou application software module is integrated into the data link application software module, and the BeiDou protocol stack software module is integrated into the data link communication management module.

The receiving, by the airborne communication navigation monitoring system, a user operation instruction, processing, by the airborne communication navigation monitoring system, the user operation instruction based on the integrated BeiDou application software module and BeiDou protocol stack software module to generate a downlink BeiDou short message includes:

receiving, by the display and control device, the user operation instruction;

transmitting, by the display and control device, the user operation instruction to the BeiDou application software module;

generating, by the BeiDou application software module, downlink message content for a downlink based on the user operation instruction, and transmitting, by the BeiDou application software module, the downlink message content to the BeiDou protocol stack software module; and processing, by the BeiDou protocol stack software module, the downlink message content to obtain the downlink short message.

A receiving method of an airborne BeiDou system is applied to the airborne BeiDou system described above. The receiving method includes:

generating, by the BeiDou server, an uplink short message, and transmitting, by the BeiDou server, the uplink short message;

receiving and transmitting, by the BeiDou transceiver, the uplink short message; and receiving, by the airborne communication navigation monitoring system, the uplink short message, parsing, by the airborne communication navigation monitoring system, the uplink short message based on the integrated BeiDou application software module and BeiDou protocol stack software module to obtain uplink message content, and displaying, by the airborne communication navigation monitoring system, the uplink message content.

In an embodiment, the airborne communication navigation monitoring system includes a display and control device and an airborne navigation device. A terminal of the airborne navigation device is connected with the display and control device and the other terminal of the airborne navigation device is connected with the BeiDou transceiver.

The airborne navigation device is integrated with an Integrated Modular Avionics. The Integrated Modular Avionics includes a data link application software module and a data link communication management module. The data link application software module interacts with the display and control device. A terminal of the data link communication management module is connected with the data link application software module, and the other terminal of the data link communication management module is connected with the BeiDou transceiver. The BeiDou application software module is integrated into the data link application software module, and the BeiDou protocol stack software module is integrated into the data link communication management module.

The receiving, by the airborne communication navigation monitoring system, the uplink short message, parsing, by the airborne communication navigation monitoring system, the uplink short message based on the integrated BeiDou application software module and BeiDou protocol stack software module to obtain uplink message content, and displaying, by the airborne communication navigation monitoring system, the uplink message content includes:

parsing, by the BeiDou protocol stack software module, the uplink short message to obtain the uplink message content, and transmitting, by the BeiDou protocol stack software module, the uplink message content;

receiving and transmitting, by the BeiDou application software module, the uplink message content; and receiving and displaying, by the display and control device, the uplink message content.

An airborne communication navigation monitoring system includes a display and control device and an airborne navigation device. A terminal of the airborne navigation device is connected with the display and control device and the other terminal of the airborne navigation device is connected with the BeiDou transceiver.

The airborne navigation device is integrated with an Integrated Modular Avionics. The Integrated Modular Avionics includes a data link application software module and a data link communication management module. The data link application software module interacts with the display and control device. A terminal of the data link communication management module is connected with the data link application software module, and the other terminal of the data link communication management module is connected with the BeiDou transceiver.

The BeiDou application software module is integrated into the data link application software module, and the BeiDou protocol stack software module is integrated into the data link communication management module.

In an embodiment, an interface protocol between the display and control device and the data link application software module is used between the BeiDou application software module and the display and control device, and an interface protocol between the data link application software module and the data link communication management module is used between the BeiDou application software module and the BeiDou protocol stack software module.

Through the above technical solutions, the following beneficial effects can be achieved.

According to the present disclosure, a BeiDou application software module and a BeiDou protocol stack software module of a BeiDou navigation communication subsystem are integrated in an airborne communication navigation monitoring system, so that the airborne communication navigation monitoring system interacts with a BeiDou transceiver and a BeiDou server through the BeiDou application software module and the BeiDou protocol stack software module, thereby realizing autonomous airborne communication navigation monitoring in the aviation field.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF THE EMBODIMENTS

Technical terms are described as following.

Integrated Modular Avionics is abbreviated as IMA.

Arinc661 protocol is a standardized protocol, developed by the ARINC company, for communication interfaces between display and control units and user applications (UAs). ARINC is the exclusive communication provider of high frequency data links.

Arinc619 protocol is a standardized protocol developed by the ARINC company for document transmission between an airborne central control system and other airborne avionics device. ARINC is the exclusive communication provider of high frequency data links.

In order to integrate a BeiDou navigation communication subsystem into an airborne communication navigation monitoring system, the present disclosure proposes to integrate a BeiDou application software module and a BeiDou protocol stack software module of the BeiDou navigation communication subsystem into the airborne communication navigation monitoring system, so that the airborne communication navigation monitoring system interacts with a BeiDou transceiver and a BeiDou server through the BeiDou application software module and the BeiDou protocol stack software module, thereby realizing autonomous airborne communication navigation monitoring in the aviation field.

The technical solutions according to the embodiments of the present disclosure are described below clearly and completely in conjunction with the drawings in the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

Figure 1:
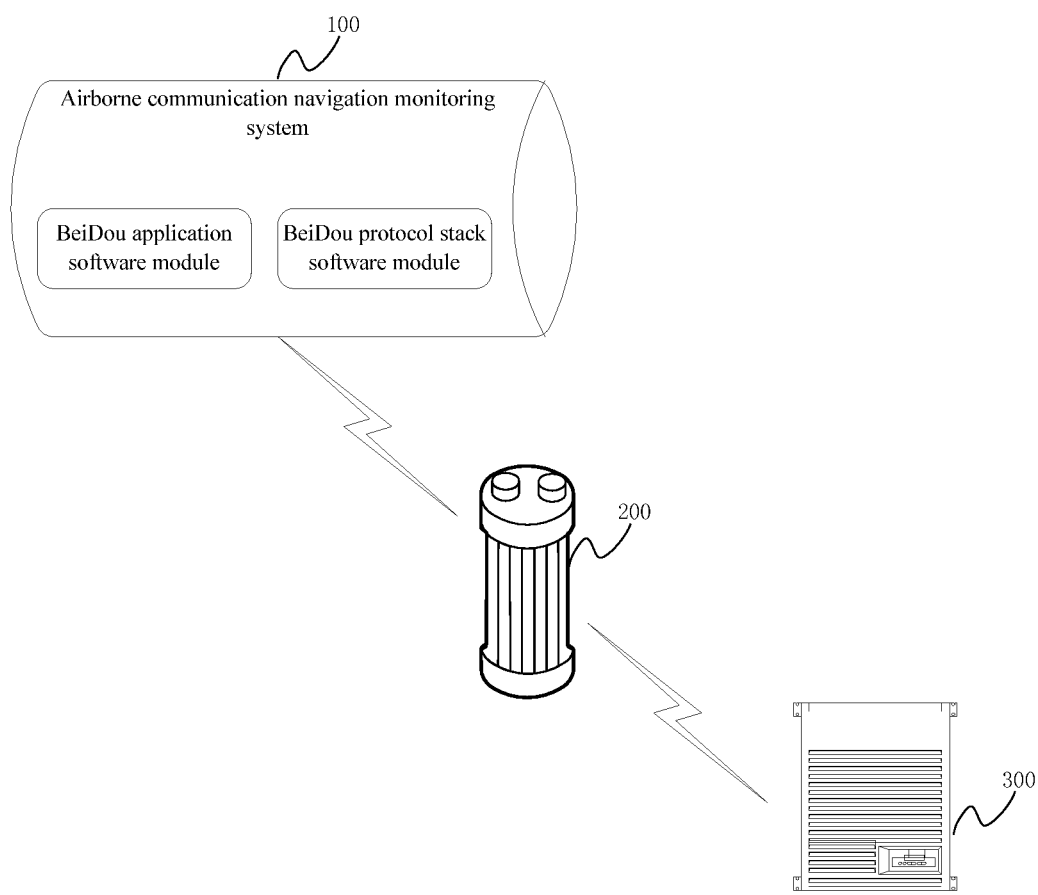
FIG. 1 is a schematic structural diagram showing a first embodiment of an airborne BeiDou system according to the present disclosure.

Referring to FIG. 1, a first embodiment of an airborne BeiDou system is provided according to the present disclosure. The airborne BeiDou system includes an airborne communication navigation monitoring system 100, a BeiDou transceiver 200, and a BeiDou server 300. The airborne communication navigation monitoring system 100 is integrated with a BeiDou application software module and a BeiDou protocol stack software module of a BeiDou navigation communication subsystem. The BeiDou transceiver 200 is connected with the airborne communication navigation monitoring system. The BeiDou server 300 is connected with the BeiDou transceiver.

In order to integrate the BeiDou navigation communication subsystem into the airborne communication navigation monitoring system, in this embodiment, the BeiDou application software module for performing transaction operations and the BeiDou protocol stack software module for performing protocol processing in the BeiDou navigation communication subsystem are integrated into the airborne communication navigation monitoring system.

Therefore, the airborne communication navigation monitoring system can interact with the BeiDou transceiver and the BeiDou server by means of the BeiDou application software module and the BeiDou protocol stack software module, thereby realizing the autonomous airborne communication navigation monitoring in the aviation field.

Figure 2:
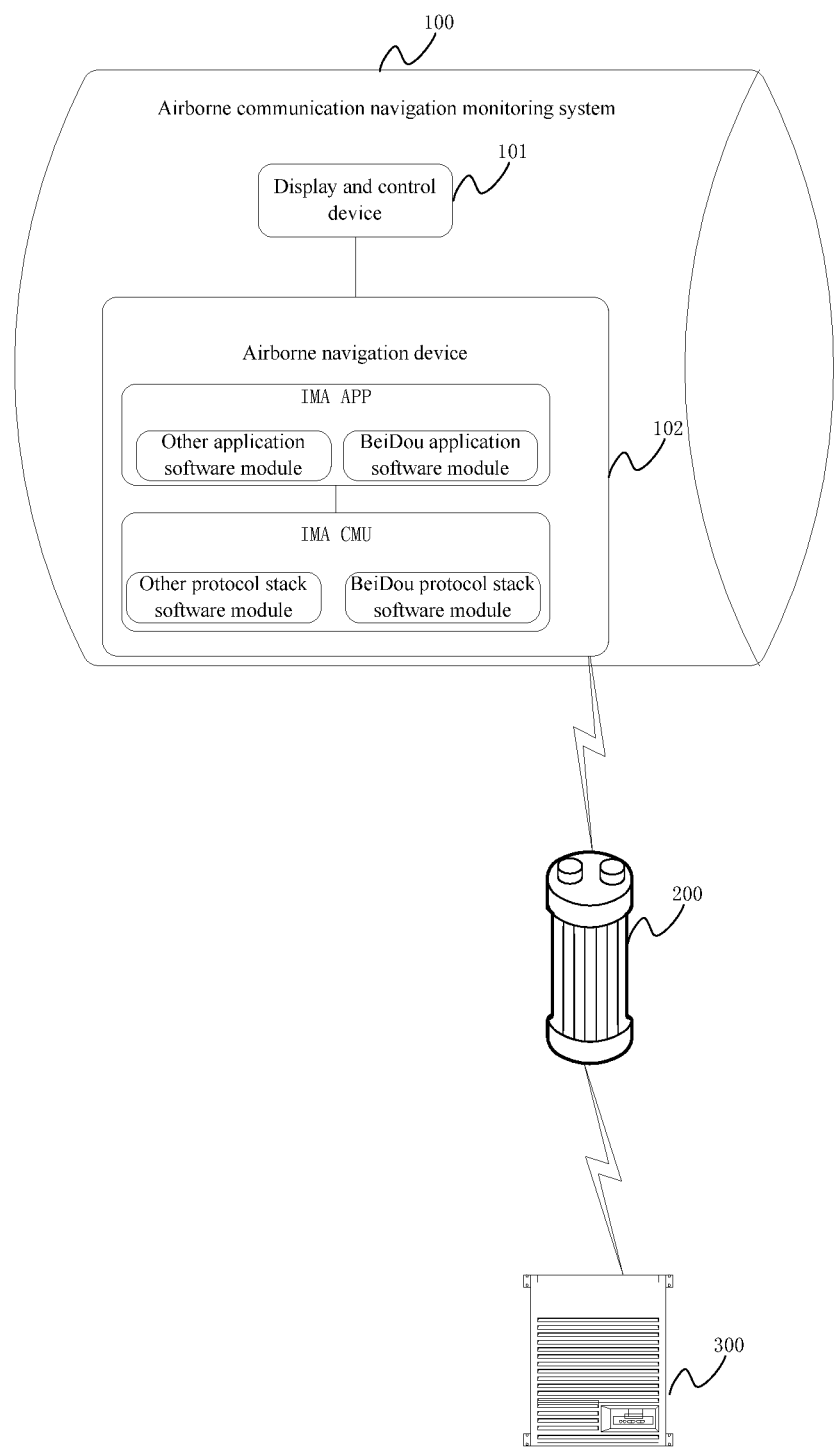
FIG. 2 is a schematic structural diagram showing a second embodiment of the airborne BeiDou system according to the present disclosure.

Referring to FIG. 2, a second embodiment of the airborne BeiDou system is provided according to the present disclosure. The airborne BeiDou system includes an airborne communication navigation monitoring system 100, a BeiDou transceiver 200, and a BeiDou server 300. The airborne communication navigation monitoring system 100 is integrated with a BeiDou application software module and a BeiDou protocol stack software module of a BeiDou navigation communication subsystem. The BeiDou transceiver 200 is connected with the airborne communication navigation monitoring system. The BeiDou server 300 is connected with the BeiDou transceiver.

The airborne communication navigation monitoring system includes a display and control device 101 and an airborne navigation device 102. A terminal of the airborne navigation device 102 is connected with the display and control device 101, and the other terminal of the airborne navigation device 102 is connected with the BeiDou transceiver 200.

The display and control device may include a Multi Combining and Distribution Unit (MCDU).

The airborne navigation device 102 is integrated with an Integrated Modular Avionics (IMA). The IMA includes a data link application software module (IMA APP) and a data link communication management module (IMA CMU). The IMA APP is used for data exchange with the display and control device. A terminal of the IMA CMU is connected with the data link application software module, and the other terminal of the IMA CMU is connected with the BeiDou transceiver.

The BeiDou application software module (BeiDou APP) is integrated into the data link application software module (IMA APP), and the BeiDou protocol stack software module (BeiDou stack) is integrated into the data link communication management module (IMA CMU).

It can be understood that an interface protocol used in the BeiDou navigation communication subsystem is different from an interface protocol used in the airborne communication navigation monitoring system. In order to be applicable to the airborne communication navigation monitoring system, protocol conversion is added, so that the BeiDou navigation communication subsystem can access the airborne communication navigation monitoring system.

An interface protocol between the display and control device and the data link application software module is used between the BeiDou application software module and the display and control device. In an embodiment, the interface protocol between the display and control device and the data link application software module includes the Arinc661 interface protocol.

An interface protocol between the data link application software module and the data link communication management module is used between the BeiDou application software module and the BeiDou protocol stack software module. In an embodiment, the interface protocol between the data link application software module and the data link communication management module includes the Arinc619 interface protocol.

Through the above technical solutions, the following beneficial effects can be achieved.

According to the present disclosure, the BeiDou application software module and the BeiDou protocol stack software module of the BeiDou navigation communication subsystem are integrated in the airborne communication navigation monitoring system, so that the airborne communication navigation monitoring system interacts with the BeiDou transceiver and the BeiDou server through the BeiDou application software module and the BeiDou protocol stack software module, thereby realizing autonomous airborne communication navigation monitoring in the aviation field.

Figure 3:
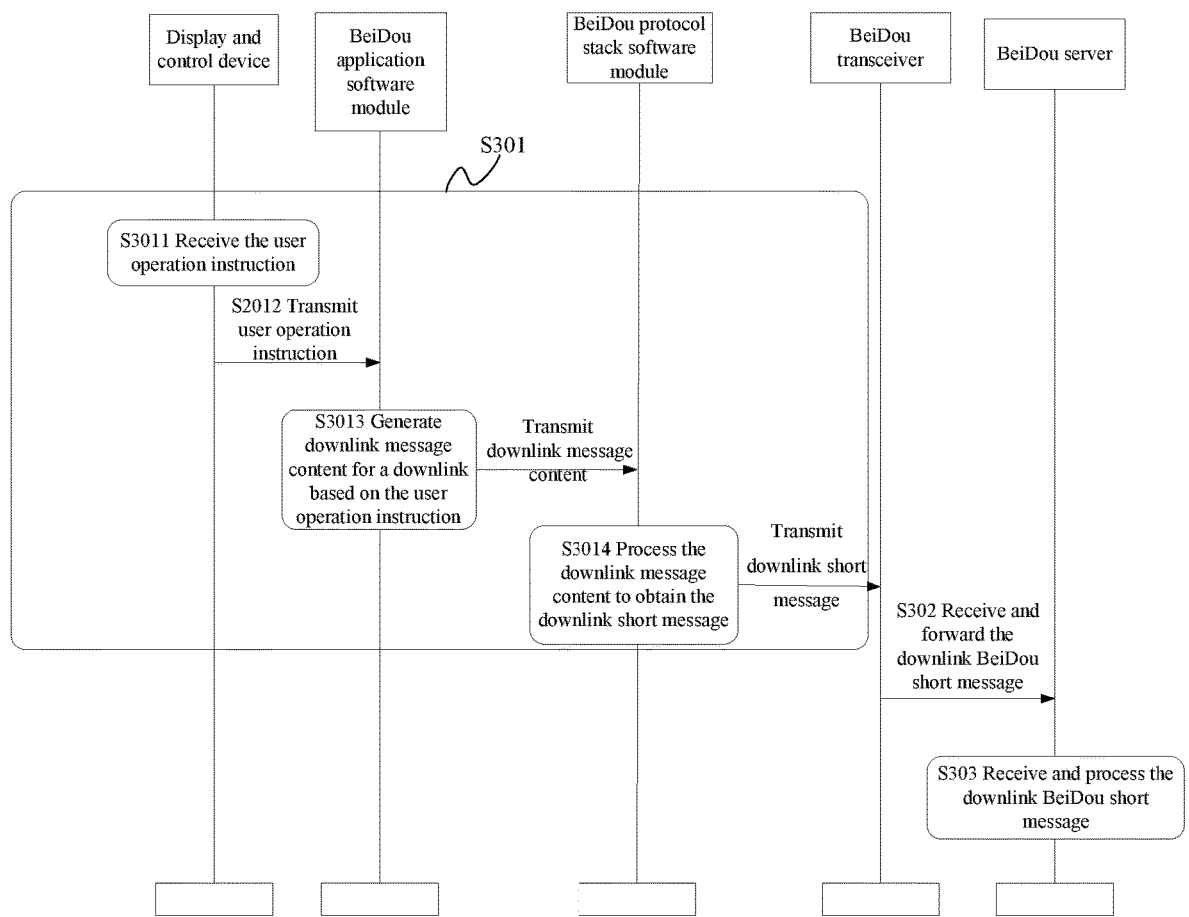
FIG. 3 is a flowchart of a transmitting method of the airborne BeiDou system according to an embodiment of the present disclosure.
Figure 4:
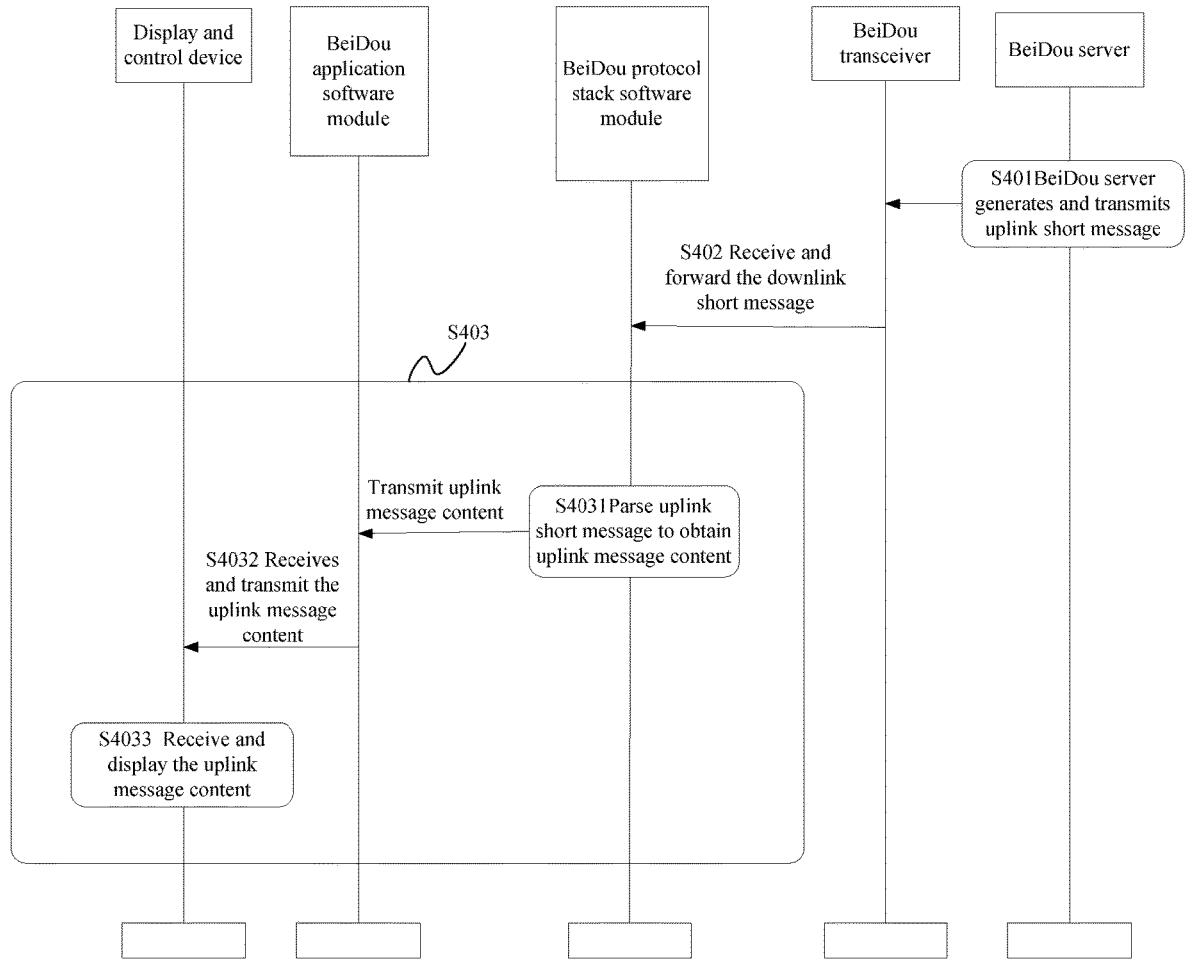
FIG. 4 is a flowchart of a receiving method of the airborne BeiDou system according to an embodiment of the present disclosure.

An application method of the airborne BeiDou system is described below. FIG. 3 shows a transmitting method of the airborne BeiDou system and FIG. 4 shows a receiving method of the airborne BeiDou system. Details are described in the following embodiments.

A transmitting method of the airborne BeiDou system is provided according to the present disclosure. The transmitting method is applied to the airborne BeiDou system shown in FIG. 2. Referring to FIG. 3, the transmitting method includes the following steps S301 to S303.

In step S301, the airborne communication navigation monitoring system receives a user operation instruction, processes the user operation instruction based on the integrated BeiDou application software module and BeiDou protocol stack software module to generate a downlink BeiDou short message, and transmits the downlink BeiDou short message.

Step S301 may include the following steps S3011 to S3014.

In step S3011, the display and control device receives the user operation instruction.

The display and control device may provide an interactive interface. A pilot may issue the instruction through the interactive interface, and the display and control device receives the user operation instruction.

In step S3012, the display and control device transmits the user operation instruction to the BeiDou application software module.

In step S3013, the BeiDou application software module generates downlink message content for a downlink based on the user operation instruction, and transmits the downlink message content to the BeiDou protocol stack software module.

The BeiDou application software module may operate according to existing transaction logic to generate the downlink message content for the downlink. A process of generating the downlink message content is mature technology, which is not repeated herein.

In step S3014, the BeiDou protocol stack software module processes the downlink message content to obtain the downlink short message, and transmits the downlink short message to the BeiDou transceiver.

The BeiDou protocol stack software module may perform a protocol processing on the downlink message content. The protocol processing is mature technology, which is not repeated herein.

In step S302, the BeiDou transceiver receives the downlink BeiDou short message and forwards the downlink BeiDou short message to the BeiDou server.

In step S303, the BeiDou server receives and processes the downlink BeiDou short message.

A receiving method of the airborne BeiDou system is provided according to the present disclosure. The receiving method is applied to the airborne BeiDou system shown in FIG. 2. Referring to FIG. 4, the receiving method includes the following steps S401 to S403.

In step S401, the BeiDou server generates an uplink short message and transmits the uplink short message.

In step S402, the BeiDou transceiver receives the uplink short message and transmits the uplink short message.

In step S403, the airborne communication navigation monitoring system receives the uplink short message, parses the uplink short message based on the integrated BeiDou application software module and BeiDou protocol stack software module to obtain uplink message content, and displays the uplink message content.

Step S403 may include the following steps S4031 to S4033.

In step S4031, the BeiDou protocol stack software module parses the uplink short message to obtain the uplink message content, and transmits the uplink message content.

The BeiDou protocol stack software module may parse the uplink short message to generate the uplink message content for subsequent operations. The parse operation is mature technology, which is not repeated herein.

In step S4032, the BeiDou application software module receives the uplink message content and transmits the uplink message content.

In step S4033, the display and control device receives and displays the uplink message content.

The display and control device may display the uplink message content for the pilot to view. The uplink message content may include position information, such as longitude and latitude coordinates and an altitude of an aircraft.

Figure 5:
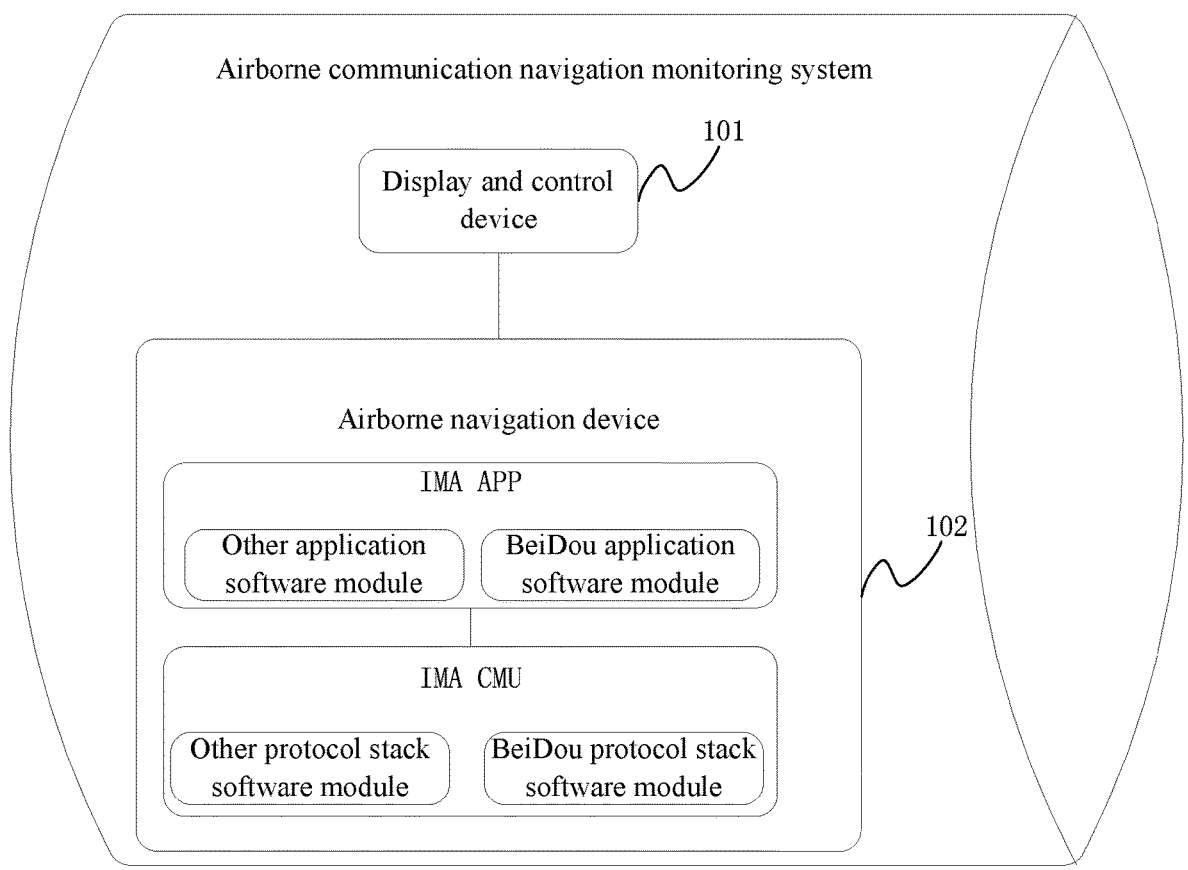
FIG. 5 is a schematic structural diagram of an airborne communication navigation monitoring system according to an embodiment of the present disclosure.

Referring to FIG. 5, an airborne communication navigation monitoring system is provided according to the present disclosure. The airborne communication navigation monitoring system includes a display and control device 101 and an airborne navigation device 102. A terminal of the airborne navigation device 102 is connected with the display and control device 101, and the other terminal of the airborne navigation device 102 is connected with the BeiDou transceiver 200.

The display and control device may include a Multi Combining and Distribution Unit (MCDU).

The airborne navigation device 102 is integrated with an Integrated Modular Avionics (IMA). The Integrated Modular Avionics (IMA) includes a data link application software module (IMA APP) and a data link communication management module (IMA CMU). The data link application software module (IMA APP) interacts with the display and control device. A terminal of the data link communication management module (IMA CMU) is connected with the data link application software module, and the other terminal of the data link communication management module (IMA CMU) is connected with the BeiDou transceiver.

The BeiDou application software module (BeiDou APP) is integrated into the data link application software module (IMA APP), and the BeiDou protocol stack software module (BeiDou stack) is integrated into the data link communication management module (IMA CMU).

It can be understood that an interface protocol used in the BeiDou navigation communication subsystem is different from an interface protocol used in the airborne communication navigation monitoring system. In order to be applicable to the airborne communication navigation monitoring system, protocol conversion is added, so that the BeiDou navigation communication subsystem can access the airborne communication navigation monitoring system.

An interface protocol between the display and control device and the data link application software module is used between the BeiDou application software module and the display and control device. In an embodiment, the interface protocol between the display and control device and the data link application software module includes the Arinc661 interface protocol.

An interface protocol between the data link application software module and the data link communication management module is used between the BeiDou application software module and the BeiDou protocol stack software module. In an embodiment, the interface protocol between the data link application software module and the data link communication management module includes the Arinc619 interface protocol.

The BeiDou transceiver mainly includes a radio frequency front end, an A/D converter, a baseband signal processing part and a navigation solution part. The radio frequency front end is configured to receive a radio frequency signal of a satellite, and down convert the signal into an intermediate frequency signal after the signal is amplified by a preamplifier. The A/D converter is configured to sample the intermediate frequency signal and quantize and encode an analog signal into a digital signal.

The baseband data signal processing part is configure to capture a satellite signal in two dimensions, track a carrier phase and a code phase, and calculate a pseudo range. The navigation solution part is configured to eliminate a model error by using an algorithm, solve a pseudo range equation, and parse a geographical position of a satellite receiver antenna, so as to realize satellite positioning.

The BeiDou navigation system uses navigation and positioning technology developed by China, which is safe and reliable. In addition to positioning, navigation and timing, the BeiDou navigation system further has a communication function, which is not available in other satellite positioning systems. With this feature, the BeiDou navigation system can not only perform self-navigation, but also transmit its own information to a remote command system or a friendly neighbor unit through short messages.

The short message function is very helpful to users in information sharing and dealing with sudden disasters. The BeiDou navigation system works in the L/S band, with a small atmospheric attenuation, small rainfall attenuation, a small transmission delay and a short response time. The communication service covers the whole territory of China and surrounding areas of China, ensuring full-area and full-time supports.

Positioning information is transmitted through short messages. Transmission of the positioning information includes two aspects. In a first aspect, for a BeiDou command aircraft and a subordinate terminal receiver, the positioning information of the terminal receiver is directly transmitted by a ground positioning center to the terminal and the superior BeiDou command aircraft simultaneously.

In a second aspect, positioning information is transmitted between the command aircraft and the user terminal and transmitted between user terminals in a self-defined data format through a BeiDou message communication channel. Transmission of the positioning data in the first aspect is directly controlled by a satellite ground positioning center without user intervention.

Short message communication is a unique function of BeiDou-1, which provides bidirectional message communication between user terminals and between a user terminal and a ground monitoring center. Each user terminal has a unique ID number to identify legal identity of the user, and an encryption method in which each user corresponds to one key is used.

All message communications must be forwarded by the ground center. The process is described as following. A short message sender encrypts a communication application signal including message content and a receiver ID, and forwards the communication application signal to a center station through a satellite. After receiving the communication application signal, the ground center station decrypts the signal and then encrypts the decrypted signal. Then, the ground center station adds the encrypted signal to an outbound broadcast message and broadcasts the message to a user through a satellite. A user terminal serving as a receiver receives and demodulates the outbound message to get the outbound signal, and then performs decryption to get the message content. In this way, the communication is completed.

The BeiDou short message communication has the following features.

The BeiDou short message communication has good confidentiality because source encryption is supported.

The BeiDou short message communication has a wide coverage because five satellite work together, covering the whole territory of China and surrounding areas of China.

The BeiDou short message communication has low requirements for device. Only a flat panel antenna with low transmission power and low price is required.

In addition, the BeiDou short message communication has navigation function.

The BeiDou short message communication mainly provides data communication service.

The BeiDou short message communication has low cost.

The networking, by taking a command user aircraft as a core, is simple.

If the functions of the method according to the embodiments of the present disclosure are implemented in form of software functional units and the software functional units are sold or used as independent products, the software functional units may be stored in a computer readable storage medium. Based on this understanding, part of the disclosure that contributes to existing technologies or part of the technical solutions may be embodied in the form of a computer software product. The computer software product is stored in a storage medium and includes several instructions for instructing a computer device (which may be personal computer, server, mobile computing device, network device or the like) to implement all of or part of the steps of the methods according to the embodiments of the disclosure. The foregoing storage medium includes various media that can store program codes, such as USB disk, mobile hard disk drive, Read-Only Memory (ROM), Random Access Memory (RAM), magnetic disk, optical disk and the like.

It should be noted that the above embodiments are only preferred embodiments of the present disclosure. Those skilled in the art can design more embodiments based on the disclosed embodiments, which are omitted herein.

Various modifications to these embodiments are apparent for those skilled in the art. General principles defined herein may be applied to other embodiments without departing from the spirit or scope of the present disclosure. Therefore, the present disclosure is not limited to the embodiments described herein, but should comply with the widest scope consistent with the principles and novel features disclosed herein.

The invention claimed is:

1. An airborne BeiDou system, comprising:
   an airborne communication navigation monitoring system into which a BeiDou application software module and a BeiDou protocol stack software module of a BeiDou navigation communication subsystem are integrated;
   a BeiDou transceiver connected with the airborne communication navigation monitoring system; and
   a BeiDou server connected with the BeiDou transceiver, wherein
   the airborne communication navigation monitoring system comprises a display and control device, and an airborne navigation device with one terminal connected with the display and control device and the other terminal connected with the BeiDou transceiver, the airborne navigation device is integrated with an Integrated Modular Avionics, and the Integrated Modular Avionics comprises:
- a data link application software module interacting with the display and control device, and
- a data link communication management module with one terminal connected with the data link application software module and the other terminal connected with the BeiDou transceiver;

the BeiDou application software module is integrated into the data link application software module, and the BeiDou protocol stack software module is integrated into the data link communication management module;

the airborne communication navigation monitoring system is configured to:

receive a user operation instruction, process the user operation instruction based on the integrated BeiDou application software module and BeiDou protocol stack software module to generate a downlink BeiDou short message, comprising: receiving, via the display and control device, the user operation instruction; transmitting, by the display and control device, the user operation instruction to the BeiDou application software module; generating, by the BeiDou application software module, downlink message content for a downlink based on the user operation instruction, and transmitting, by the BeiDou application software module, the downlink message content to the BeiDou protocol stack software module; and processing, by the BeiDou protocol stack software module, the downlink message content to obtain the downlink short message.

2. The airborne BeiDou system according to claim 1, wherein an interface protocol between the display and control device and the data link application software module is used between the BeiDou application software module and the display and control device; and an interface protocol between the data link application software module and the data link communication management module is used between the BeiDou application software module and the BeiDou protocol stack software module.

3. The airborne BeiDou system according to claim 2, wherein
the interface protocol between the display and control device and the data link application software module comprises an Arinc661 interface protocol; and
the interface protocol between the data link application software module and the data link communication management module comprises an Arinc619 interface protocol.

4. A receiving method of an airborne BeiDou system, applied to the airborne BeiDou system according to claim 1, the method comprising:
generating, by the BeiDou server, an uplink short message, and transmitting, by the BeiDou server, the uplink short message;
receiving and transmitting, by the BeiDou transceiver, the uplink short message; and
receiving, by the airborne communication navigation monitoring system, the uplink short message, parsing, by the airborne communication navigation monitoring system, the uplink short message based on the integrated BeiDou application software module and BeiDou protocol stack software module to obtain uplink message content, and displaying, by the airborne communication navigation monitoring system, the uplink message content, the receiving, by the airborne communication navigation monitoring system, the uplink short message, parsing, by the airborne communication navigation monitoring system, the uplink short message based on the integrated BeiDou application software module and BeiDou protocol stack software module to obtain uplink message content, and displaying, by the airborne communication navigation monitoring system, the uplink message content comprises:
parsing, by the BeiDou protocol stack software module, the uplink short message to obtain the uplink message content, and transmitting, by the BeiDou protocol stack software module, the uplink message content;
receiving and transmitting, by the BeiDou application software module, the uplink message content; and
receiving and displaying, by the display and control device, the uplink message content.

5. An airborne communication navigation monitoring system, comprising:
a display and control device; and
an airborne navigation device with one terminal connected with the display and control device and the other terminal connected with a BeiDou transceiver, wherein:
the airborne navigation device is integrated with an Integrated Modular Avionics, and the Integrated Modular Avionics comprises:
- a data link application software module interacting with the display and control device, and
- a data link communication management module with one terminal connected with the data link application software module and the other terminal connected with the BeiDou transceiver; and
a BeiDou application software module is integrated into the data link application software module, and a BeiDou protocol stack software module is integrated into the data link communication management module, the airborne communication navigation monitoring system is configured to:
receive a user operation instruction, process the user operation instruction based on the integrated BeiDou application software module and BeiDou protocol stack software module to generate a downlink BeiDou short message, comprising: receiving, via the display and control device, the user operation instruction; transmitting, by the display and control device, the user operation instruction to the BeiDou application software module; generating, by the BeiDou application software module, downlink message content for a downlink based on the user operation instruction, and transmitting, by the BeiDou application software module, the downlink message content to the BeiDou protocol stack software module; and processing, by the BeiDou protocol stack software module, the downlink message content to obtain the downlink short message.

6. The airborne communication navigation monitoring system according to claim 5, wherein:
an interface protocol between the display and control device and the data link application software module is used between the BeiDou application software module and the display and control device; and
an interface protocol between the data link application software module and the data link communication management module is used between the BeiDou application software module and the BeiDou protocol stack software module.

\* \* \* \* \*